UNITED STATES PATENT OFFICE.

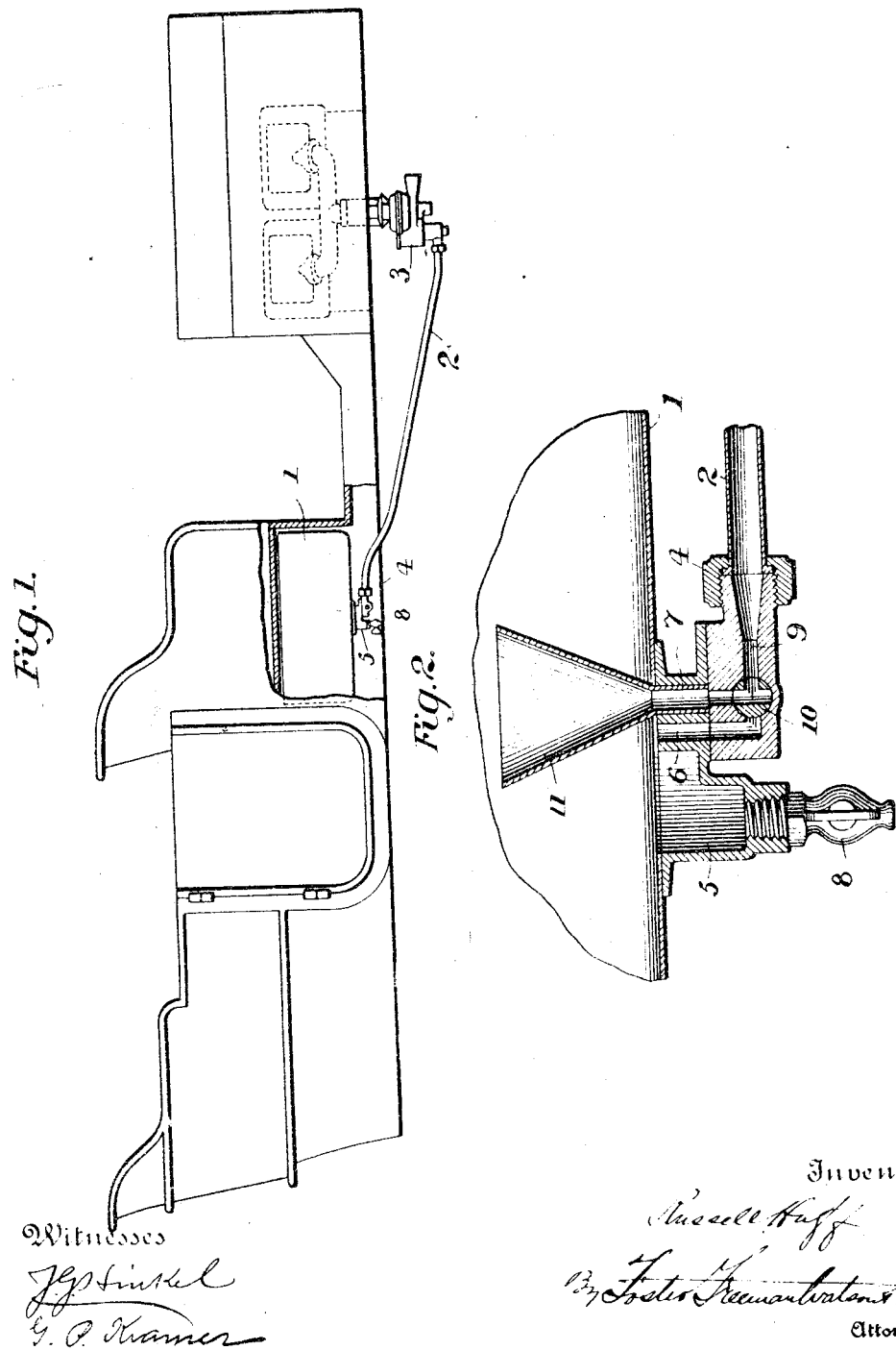

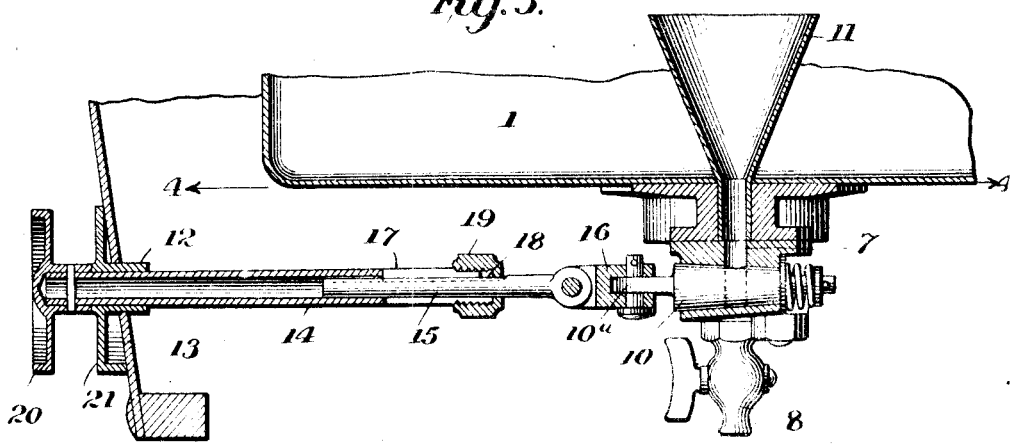
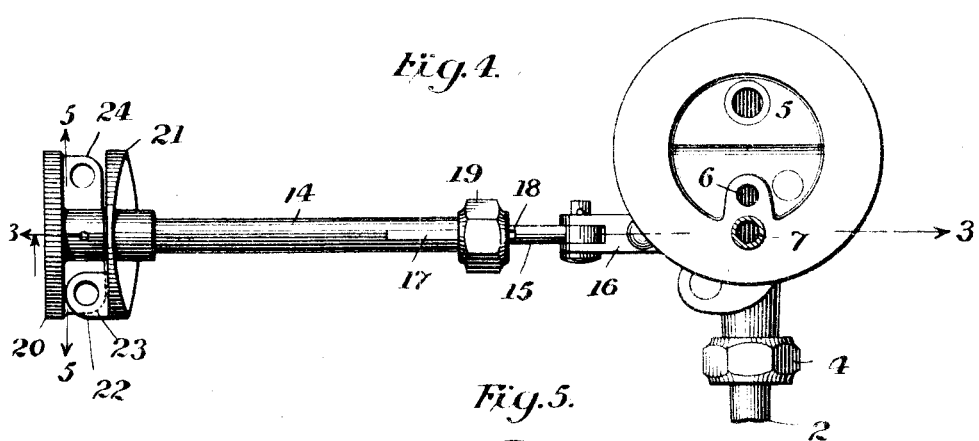
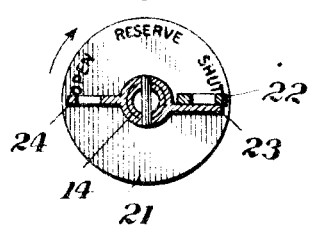

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

MOTOR-VEHICLE.

1,132,850.   Specification of Letters Patent.   Patented Mar. 23, 1915.

Application filed November 6, 1908. Serial No. 461,400.

*To all whom it may concern:*

Be it known that I, RUSSELL HUFF, a citizen of the United States, and resident of Detroit, in the county of Wayne and State of Michigan, have invented certain new and useful Improvements in Motor-Vehicles, of which the following is a specification.

The present invention relates to improvements in motor vehicles and particularly to the means for holding a supply of gasolene and controlling the passage thereof to the carbureter of the engine.

In the accompanying drawings: Figure 1 is a side elevation partly broken away of a portion of the body of a motor vehicle having the present invention applied thereto; Fig. 2 is an enlarged detail view of a portion of the gasolene tank and parts attached thereto; Fig. 3 is a sectional view substantially on the line 3—3 of Fig. 4; Fig. 4 is a plan of parts shown in Fig. 3 partly in section on the line 4—4 of that figure; Fig. 5 is a view on line 5—5 of Fig. 4.

Referring to the drawings, 1 designates the gasolene tank which, as shown, is arranged beneath the forward seat of the vehicle, being suitably supported from the frame, and 2 designates the pipe through which the engine carbureter 3 receives its supply of gasolene. The rear end of the pipe 2 is secured by a coupling 4 to a casing attached to the bottom of the tank 1 and having therein a sediment pocket or well 5 and two passages 6, 7, which communicate with suitable passages or apertures in the bottom of the tank. In the lower end of the sediment pocket 5 is secured a drain cock 8, and the lower ends of the passages 6, 7 are connected by a duct or passage 9 which communicates with the carbureter supply pipe 2. A three-way plug valve 10 is adapted to connect either of the passages 6, 7 with the pipe 2 or to close both of said passages.

11 designates a tube which is fitted within the passage 7 and extends upwardly within the tank 1 for a suitable distance. Preferably the portion of this tube 11 within the tank is expanded at its upper end so as to have the general form of a funnel, as represented. When the valve 10 is in the normal position represented in Fig. 2, gasolene will be drawn from the tank 1 through the tube 11 which extends several inches above the bottom of the tank. The purpose of thus extending the tube 11 upwardly in the tank is to guard against the withdrawal of all the gasolene from the tank without notice to the machine operator, as by this construction a reserve body of gasolene is maintained in the tank below the upper end of the tube 11 which can be only drawn upon by turning the valve 10 so as to connect the passage 6 with the pipe 2.

The valve 10 is actuated by a shaft connected thereto at one end and having its other end extending through a bearing 12 supported in one of the side panels 13 of the vehicle body. As the tank 1 is subject to more or less relative movement with regard to the vehicle body, and also in order that the parts may be more readily assembled, the valve actuating shaft is connected with the valve by a universal joint. In order to prevent the necessity of making a special length of shaft for each vehicle or arranging all of the tanks at exactly the same distance from the bearing 12, the said shaft is made extensible, consisting of two telescoping sections 14, 15, the former being tubular and extending through the bearing 12, while the inner section 15 extends into said outer section 14 and is connected by a universal joint 16 with stem 10ᵃ of the valve 10. The inner end of the member 14 of the valve actuating shaft is provided with longitudinal slots, and a key 17 is adapted to extend through either of said slots and fit within a longitudinal groove 18 formed in the shaft member 15 to prevent any turning movement of the shaft sections relative to each other. By means of a clamping sleeve 19 which screws onto the member 14 and over the key 17 the members 14, 15 of the valve actuating shaft can be rigidly connected in any adjusted position. On the outer end of said shaft is secured a handle 20 shown as being of circular form. A circular disk or plate 21, which may, as shown, be supported by the outer end of the bearing 12, surrounds the shaft outside of the vehicle body and is provided with an outwardly projecting ear or lug 22 and with the words "Open," "Reserve" and "Shut" arranged in the order shown in Fig. 5, or with any other suitable indicating marks representing the three positions into which the valve 10 may be adjusted.

Connected with the handle 20 are two lugs 23, 24 adapted to coöperate with the stationary lug or stop 22, and by their relation to said lug and the aforesaid words on the plate, indicate the position of the valve 10. When the parts are in the position shown in Fig. 5 the valve 10 has been adjusted to the position shown in Fig. 2 in which the tube 11 and passage 7 are connected with the carbureter supply pipe 2. By turning the shaft in the direction of the arrow in Fig. 5, the valve will first be caused to close the passage 7 and connect the passage 6 with the supply pipe 2, thus drawing upon the "reserve" supply of gasolene in the tank 1. If the turning movement of the valve is continued until the lug 24 contacts with the stop 22, the valve 10 will be adjusted to close both the passages 6 and 7, and, in order that the parts may be maintained in this position, the lugs 22 and 24 are preferably provided with apertures through which a padlock or other fastening means may be inserted when said lugs are in contact. As shown the casing in which the sediment pocket 5 and passages 6, 7 are formed is preferably made in two sections connected by suitable bolts, and the casing itself is connected with the bottom of the tank by soldering or any other suitable means.

Having thus described the invention, what is claimed is:

1. In a motor vehicle, the combination with the vehicle body and gasolene tank, of a valve controlling the passage of gasolene from the tank to the carbureter, a shaft comprising two telescoping sections, one connected with the valve by a universal joint, and the other extending through a side of the body of the vehicle, and having at its free end a handle, a key fitted in a groove in one section of the rod and extending into a slot in the other, and a clamping sleeve surrounding the sections and adapted to hold them in any adjusted position.

2. In a motor vehicle, the combination with the vehicle body and gasolene tank, of a valve controlling the passage of gasolene from the tank to the carbureter, a handle arranged on the vehicle body, a universally jointed rotatable shaft connecting the valve and handle, and coöperating stops on the vehicle body and shaft for indicating the relative position of the valve, some of said stops being constructed to receive a locking device.

In testimony whereof I affix my signature in presence of two witnesses.

RUSSELL HUFF.

Witnesses:
L. C. TENNEY,
HOWARD HARKNESS.